D. A. LINDSAY.
MEANS FOR ADJUSTING THE THROW OF THE CAMS FOR OPERATING VALVES IN GAS ENGINES.
APPLICATION FILED DEC. 15, 1906.
953,424.
Patented Mar. 29, 1910.
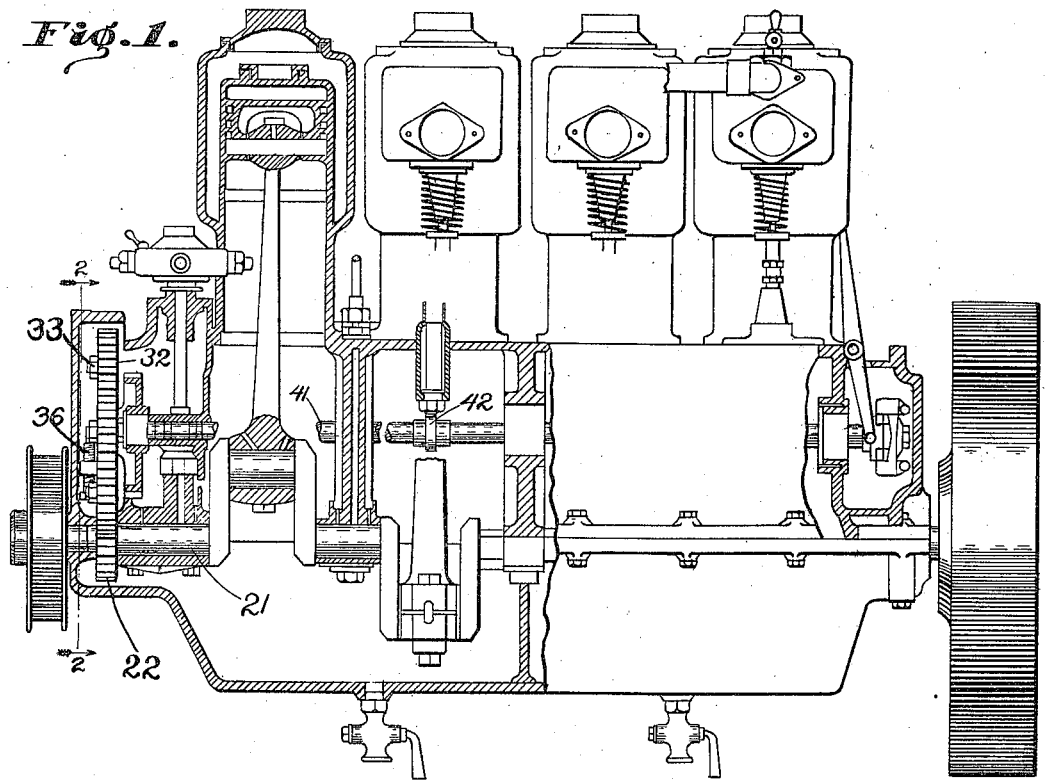
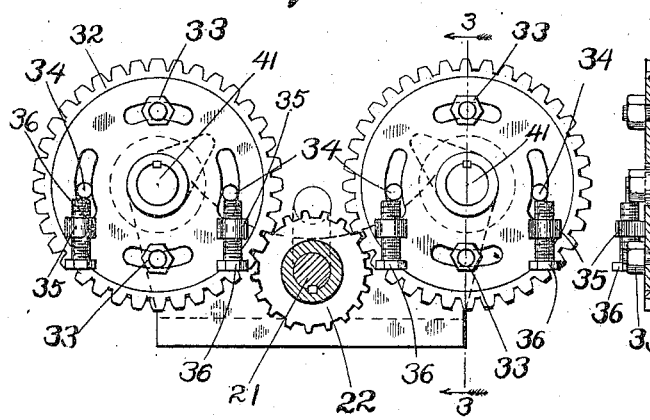
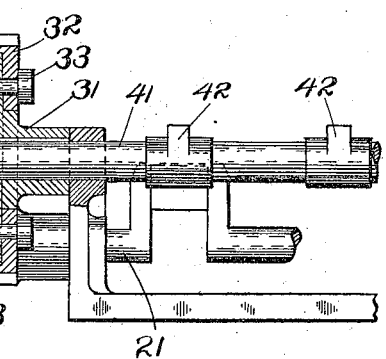
Witnesses
K. R. Glendening.
Thomas W. McMeans
Inventor
David A. Lindsay,
By Bradford & Hood,
Attorneys

UNITED STATES PATENT OFFICE.

DAVID A. LINDSAY, OF KOKOMO, INDIANA.

MEANS FOR ADJUSTING THE THROW OF THE CAMS FOR OPERATING VALVES IN GAS-ENGINES.

953,424. Specification of Letters Patent. Patented Mar. 29, 1910.

Application filed December 15, 1906. Serial No. 348,001.

*To all whom it may concern:*

Be it known that I, DAVID A. LINDSAY, a citizen of the United States, residing at Kokomo, in the county of Howard and State of Indiana, have invented certain new and useful Improvements in Means for Adjusting the Throw of the Cams for Operating Valves in Gas-Engines, of which the following is a specification.

As is well known, it is very desirable that the operation of the valves in a multi-cylinder gas engine should be accurately "timed". This is a rather difficult matter initially, while it is still more difficult to effect a proper readjustment after the valve-operating cams become worn.

It is the purpose of my present invention to provide not only for a very accurate primary adjustment of the devices which operate the valves, but also a means by which they can be adjusted to compensate for wear or slight displacement.

Referring to the accompanying drawings, which are made a part hereof, and on which similar reference characters indicate similar parts, Figure 1 is a view partly in section and partly in side elevation of a multi-cylinder gas engine of the character in question embodying my present invention; Fig. 2, a fragmentary elevation of the gears by which the cam-shafts are driven, and immediately adjacent parts, as seen when looking in the direction indicated by the arrows in dotted line 2 2 in Fig. 1, and Fig. 3 a detail sectional view as seen when looking in the direction indicated by the arrows in line 3 3 in Fig. 2.

The engine is or may be of any suitable or desired construction, and therefore, as it forms no part of my present invention, will not be further described herein, except incidentally in describing said invention. The crank shaft 21 of said engine is mounted in suitable bearings in the framework, as is usual, and performs the usual service of an engine crank shaft. Upon this crank shaft is a pinion 22 which engages with the rim portions of the gear wheels by which the cam shafts which bear the valve-operating cams are driven. Each of these spur gear wheels consists of a hub 31 and a rim 32 having overlapping portions which are united by bolts 33; which bolts pass through holes in one of said parts and slots in the other, so that the hub portions and rim portions can be relatively adjusted circumferentially. Through other slots studs or projections 34 extend. Upon the flange or web extending out from the hub portion 31 I provide projections or bosses 35 into which are threaded adjusting screws 36. These adjusting screws bear against the studs or projections 34, so that when the parts are assembled the adjustment may be accurately secured and reliably maintained. The hubs 31 of these gear-wheels are mounted upon the ordinary cam shafts 41, and said shafts bear the ordinary cams 42, by means of which the engine valves are operated. These cam shafts together with their cams, are accurately positioned in relation to each other by the adjustments which have been described; and, as the cams wear, a further adjustment can be easily effected from time to time, and the "timing" accurately maintained. When any inaccuracy is discovered all that is necessary is to loosen the nuts 34, back up one adjusting screw 36 and tighten the other. Then tighten the nuts 34 and the device is ready for further use.

Having thus fully described my said invention, what I claim as new and desire to secure by Letters Patent, is:—

1. The combination, in a valve gear, of two cam shafts, cams thereon for actuating the valves, a gear on each of said shafts by which it is driven, the crank shaft, a pinion on said crank shaft engaging with and driving the cam shaft gears, said cam shaft gears being each composed of two parts which are circumferentially relatively adjustable, with means for rigidly holding the cam-shaft-gear members in any desired position of adjustment.

2. The combination, in a multi-cylinder engine, of the valves, cams for operating said valves, cam shafts on which said cams are mounted, a driving shaft, a gear thereon, gears mounted on the cam shafts engaging with the gears on the driving shaft and each composed of a hub portion and a rim portion, and means whereby said hub portion and rim portion may be adjusted circumferentially in relation to each other, with means for rigidly holding the cam-shaft-gear members in any desired position of adjustment.

In witness whereof, I have hereunto set my hand and seal at Indianapolis, Indiana, this eighth day of December, A. D. one thousand nine hundred and six.

DAVID A. LINDSAY. [L. S.]

Witnesses:
CHESTER BRADFORD,
THOMAS W. McMEANS.